R. C. BENNER.
ELECTRIC BATTERY.
APPLICATION FILED MAY 5, 1920.

1,400,513.

Patented Dec. 20, 1921.

Inventor
Raymond C. Benner,
By Byrnes Townsend & Brickenstein
Attorney

UNITED STATES PATENT OFFICE.

RAYMOND C. BENNER, OF FREMONT, OHIO, ASSIGNOR TO NATIONAL CARBON COMPANY, INC., A CORPORATION OF NEW YORK.

ELECTRIC BATTERY.

1,400,513.  Specification of Letters Patent.  Patented Dec. 20, 1921.

Application filed May 5, 1920. Serial No. 379,123.

*To all whom it may concern:*

Be it known that I, RAYMOND C. BENNER, a citizen of the United States, residing at Fremont, in the county of Sandusky and State of Ohio, have invented certain new and useful Improvements in Electric Batteries, of which the following is a specification.

This invention relates to deferred action dry cells of the type which are activated by the addition of a suitable liquid.

It is customary in dry cells of this type to add water or electrolyte solution for moistening the depolarizing mix through an opening in the seal or through a hollow carbon electrode having transverse perforations. In constructions of this kind it usually requires considerable time and repeated filling to moisten the mix sufficiently to give the requisite amperage. If a user adds only sufficient liquid to moisten the mix to the extent to which it is moistened in ordinary dry cells, the cells do not come up to the desired initial amperage, and therefore, it is necessary to add liquid in excess of the optimum amount, and quite usual to add all the liquid a cell will hold by repeated refilling.

It is the object of the present invention to provide a construction which facilitates the distribution of the liquid and is adapted to be activated by a single addition of liquid to the cell.

It has been found that a cell may be activated sufficiently to give the initial amperage expected from reserve cells by simply moistening the lining and portions of the mix adjacent thereto. For maximum ampere-hour service, however, it is necessary to uniformly moisten the mix throughout. An excess of water is quite likely to cause leakage during service.

In accordance with the invention, an absorbent lining having passage therein is used between the zinc electrode and mix to supply liquid to the lining and the adjacent portions of the mix.

My invention further resides in the combination of this feature with a chamber and passages in the cell adapted to receive at a single filling all the liquid necessary to properly moisten the mix, thus serving as a measuring space for the liquid to be added.

In accordance with another aspect of the invention, a receptacle such as a hollow carbon electrode and chamber, is filled with dry electrolyte salt and water is added thereto to dissolve the electrolyte salt and moisten a dry depolarizing mix which contains little or no electrolyte salt.

In the construction illustrated by way of example in the drawings:—

Figure 1:
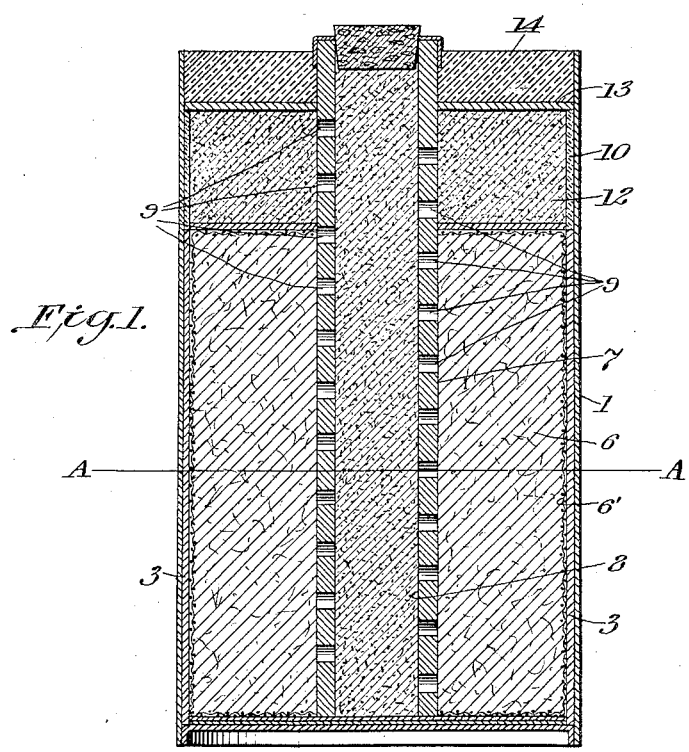
Figure 1 is a central longitudinal section of a cell embodying the invention.
Figure 2:
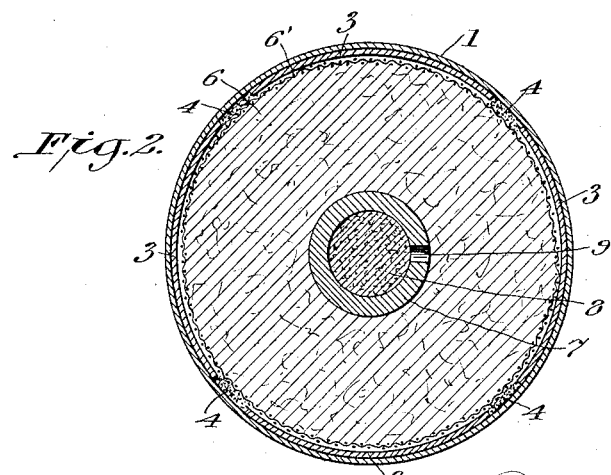
Fig. 2 is a cross section on the line A—A of Fig. 1.

The construction comprises a zinc container electrode 1 having a lining consisting of four longitudinal strips 3 of absorbent paper such as strawboard. The strips are spaced apart and of such width that the edges do not meet, thus leaving equidistant passages 4 adjacent the zinc electrode. These passages are preferably filled with dry granular electrolyte salts or with dry permeable paste containing electrolyte salts such as is described in a copending application of R. C. Benner and H. F. French, Serial No. 356,496, filed February 5, 1920. The mix 6 which preferably consists of carbon and manganese dioxid in a dry condition with little or no electrolyte salt therein, is molded around a central carbon electrode 7 having a longitudinal perforation 8 and a plurality of transverse perforations 9 extending to within a short distance of the upper end of the electrode which projects from the mix. The mix is preferably wrapped in cloth 6'.

The upper end of the zinc container is provided with a liner 10 of strawboard and an insulating disk is fitted therein above the mix. A chamber 12 is provided in the upper end of the cell which is filled to a suitable distance with dry granular electrolyte salts. The upper end of the cell is closed in the usual manner by an insulating disk 13 in chamber 12 and a seal 14.

The hollow carbon electrode may also contain electrolyte salts preferably of a non hygroscopic nature. It is desirable to divide the electrolyte salts necessary for the cell, between the chamber 12, hollow carbon electrode and passages 4.

When the cell is to be put into action, the interior may be readily filled with water as the materials therein are readily permeable. The water will be poured in quite rapidly without giving the electrolyte salts time to entirely dissolve. The chamber 12, hollow carbon electrode and passages 4 provide a reasonably accurate means when properly proportioned for measuring the liquid to be added. As the water passes into the mix and the passages 4, it dissolves the electrolyte salts, giving a concentrated solution. The moistening of a portion of the exterior of the mix occurs very quickly as passage of the liquid to the passages 4 adjacent the zinc is practically unimpeded. The relationship necessary for service between the mix and zinc over the portions adjacent the passages is thus established almost immediately. The complete moistening of the lining occurs subsequently but in a relatively short time. The uniform moistening of the less permeable mix from the interior may then be allowed to proceed slowly without material disadvantage as sufficient moistening has been provided at the exterior for satisfactory service.

In the ordinary type of reserve cell in which the electrolytic salts are placed in the mix, the addition of water dissolves these salts from between manganese dioxid and carbon particles, thus loosening the mix which makes the internal resistance of the cell higher due to poor contact between the particles of carbon and manganese, with consequent lowering amperage of the cell.

The arrangement described permits the mix to be satisfactorily moistened without loosening the mix.

Having described my invention, what I claim is:

1. In a dry cell of the kind described, the combination of a depolarizing mix, a zinc electrode, and spacing means adjacent the mix and zinc electrode having passages therein for conveying liquid to moisten the mix.

2. In a dry cell of the kind described, the combination of a depolarizing mix, a zinc electrode surrounding the mix and a lining between the mix and zinc electrode having longitudinally extending passageways therein for moistening the exterior portions of the mix.

3. In an electric cell of the kind described, the combination of a dry depolarizing mix, a zinc electrode surrounding the mix, and a lining between the mix and zinc electrode having longitudinally extending passageways therein, said cell having an opening for adding liquid thereto connected with the passageways for moistening the exterior of the mix.

4. In an electric cell of the kind described, the combination of a depolarizing mix, a zinc electrode, a lining between the mix and zinc electrode having passageways therein, and a measuring space within the cell adapted to receive all the liquid necessary to activate the cell, said measuring space being connected to the passageways.

5. In an electric cell of the kind described, the combination of a dry depolarizing mix substantially free from electrolyte salts, a zinc electrode surrounding the mix, a lining between the mix and zinc electrode having passageways therein and a receptacle within the cell connected with the passageways containing a supply of dry electrolyte salts.

6. In an electric cell of the kind described, the combination of a depolarizing mix, a zinc electrode surrounding the mix, a lining between the mix and zinc electrode having passageways therein, a measuring space within the cell adapted to receive all the liquid necessary to activate the cell, said measuring space being connected to the passageways and containing a supply of dry electrolyte salts.

7. In an electric cell of the kind described, the combination of a depolarizing mix, a zinc electrode surrounding the mix, a lining between the mix and zinc electrode having passageways therein, a longitudinally and transversely perforated carbon electrode in the mix, and a chamber in the cell connected with the perforated carbon electrode and passageways.

8. In a dry cell of the kind described, the combination of a depolarizing mix, a zinc electrode surrounding the mix and a lining between the mix and zinc electrode having passageways therein containing electrolyte salts.

9. In a dry cell of the kind described, the combination of a depolarizing mix, a zinc electrode surrounding the mix and a lining between the mix and zinc electrode having passageways therein containing a permeable paste having electrolyte salts incorporated therewith.

10. In a dry cell of the kind described, the combination of a dry depolarizing mix, a zinc electrode surrounding the mix, a lining between the mix and zinc electrode having passageways therein and a measuring space for the liquid to be added connected to the passageways and containing a supply of dry electrolyte salts.

11. In a dry cell of the kind described, the combination of a dry depolarizing mix substantially free from electrolyte salts, a zinc container electrode, a lining of absorbent material between the mix and zinc electrode having longitudinally extending passageways therein, a longitudinally and transversely perforated carbon electrode in the mix, a chamber within the cell connected with the perforated carbon electrode and passageways, said carbon electrode, chamber and passageways containing dry electrolyte salts and adapted to receive at a single filling all the liquid necessary to activate the cell.

In testimony whereof, I affix my signature.

RAYMOND C. BENNER.